Aug. 12, 1930.  F. P. WALSH  1,772,848
DROP PIT
Filed Feb. 29, 1928   2 Sheets-Sheet 1
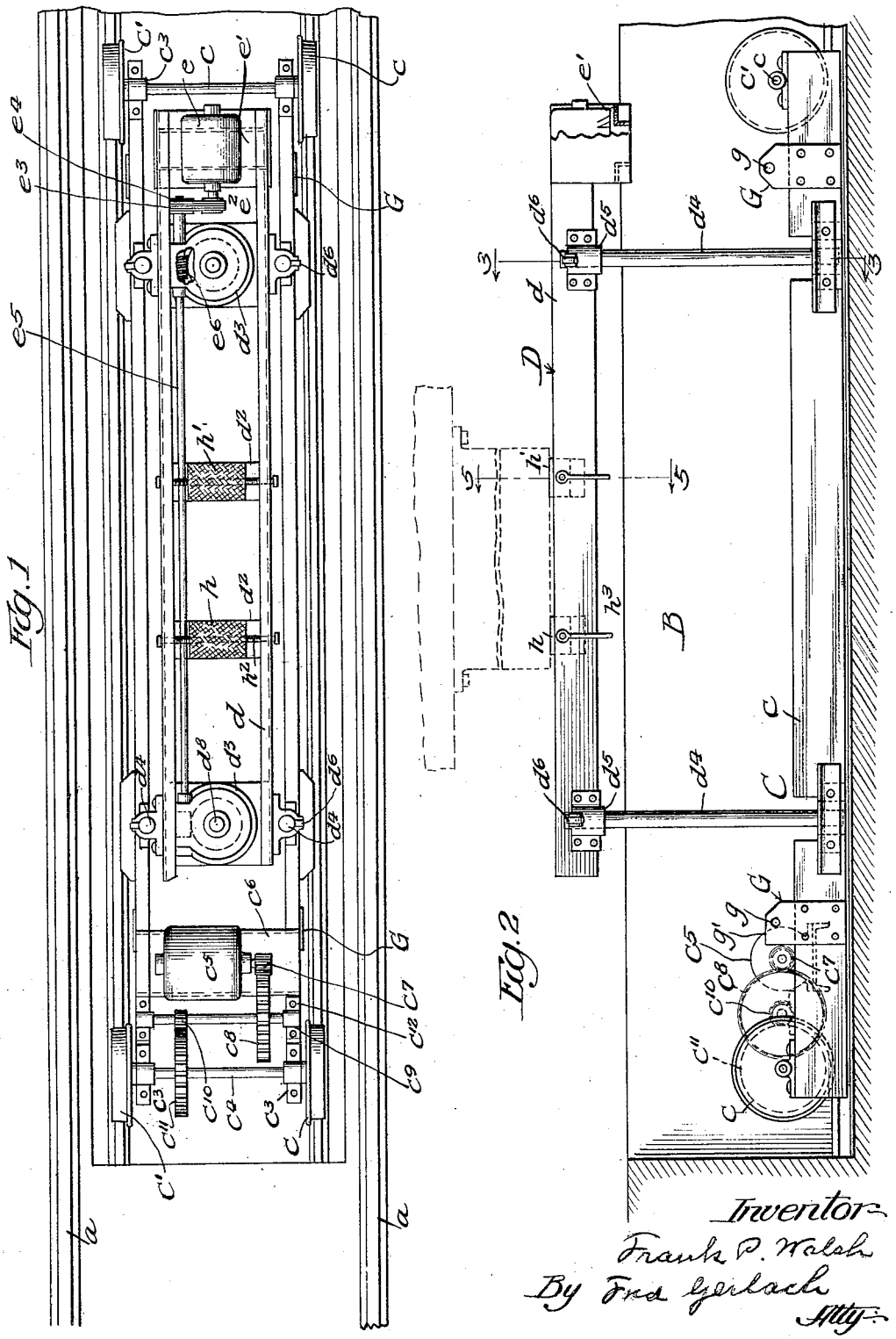
Inventor
Frank P. Walsh
By Fred Gerlach
Atty.

Aug. 12, 1930.  F. P. WALSH  1,772,848
DROP PIT
Filed Feb. 29, 1928  2 Sheets-Sheet 2
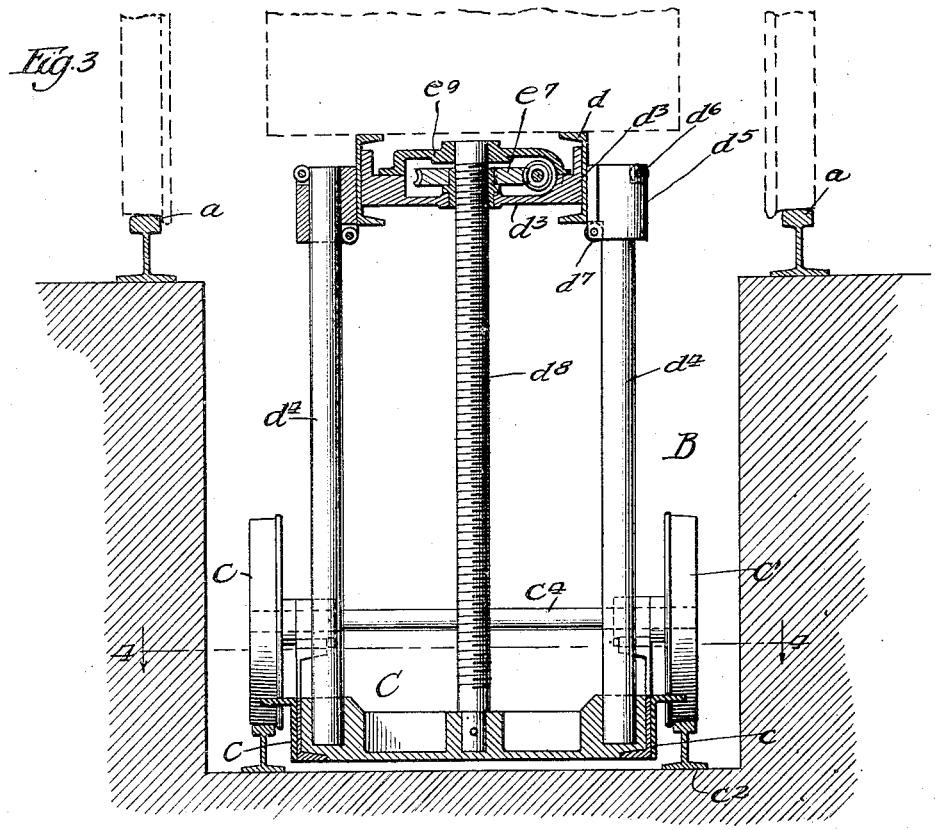
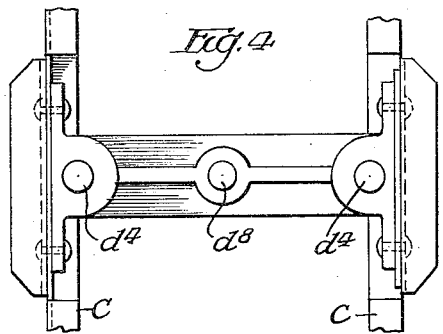
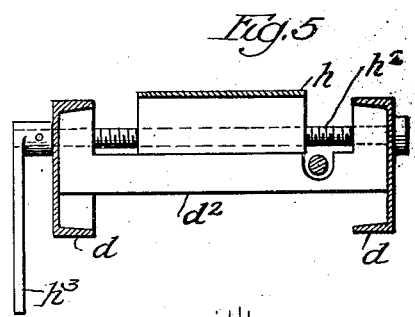
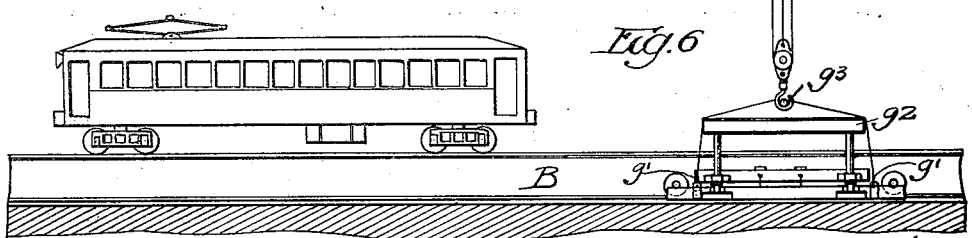
Inventor
Frank P. Walsh
By Fred Gerlach Atty Patented Aug. 12, 1930

1,772,848

UNITED STATES PATENT OFFICE

FRANK P. WALSH, OF HARVEY, ILLINOIS, ASSIGNOR TO WHITING CORPORATION, OF HARVEY, ILLINOIS, A CORPORATION OF ILLINOIS

DROP PIT

Application filed February 29, 1928. Serial No. 257,908.

The invention relates to drop-pits.

In the maintenance of electric railway cars, it occasionally becomes necessary to remove and repair or replace units, such as transformers, which are usually mounted below the car-body.

One object of the invention is to provide an improved pit and mechanism therein for expeditiously removing and replacing such units.

A further object of the invention is to provide improved means for guiding the droptable or carriage for supporting the unit and transporting it from under the vehicle so it can be removed from the pit.

A still further object of the invention is to provide a structure comprising a truck for supporting the vertically movable carriage which is adapted to be hoisted from one pit for placement and use in another when desired, so that a single structure may serve a number of pits.

A still further object of the invention is to provide the vertically movable carriage for supporting the unit with means for laterally or angularly shifting the unit while it is being replaced, to bring it into accurate registry with the part to which it is to be secured, preparatory to its attachment to the vehicle.

Other objects of the invention will appear from the detailed description.

The invention consists in the several novel features hereinafter set forth and more particularly defined by claims at the conclusion hereof.

In the drawings: Fig. 1 is a plan of an equipment embodying the invention. Fig. 2 is a vertical section, the vertically movable carriage for supporting the unit to be removed being shown in its raised position. Fig. 3 is a section on line 3—3 of Fig. 2. Fig. 4 is a section on line 4—4 of Fig. 3. Fig. 5 is a section on line 5—5 of Fig. 2. Fig. 6 is a longitudinal section of the pit showing the manner of transporting the drop table structure between pits.

The invention is exemplified in a shop equipment comprising a track formed by a pair of rails $a$ on which the railway cars are adapted to run. A pit B extends longitudinally of, and between, said rails $a$. This pit is of sufficient length to permit a unit removed and lowered from the body of the car to be transported beyond one end of the car, so the unit may be elevated out of the pit and so a repaired or replaced unit may be reversely shifted into position to be mounted on the car.

A truck C is mounted to travel longitudinally of the pit B and comprises a frame $c$ composed of beams and members rigidly secured together; and wheels $c'$ at the sides of the frame adapted to run on rails $c^2$ laid on the bottom of the pit. This truck supports a vertically movable drop table or carriage D for supporting and raising and lowering the unit to be removed from, or to be replaced on, the vehicle, and is adapted to transport the table or carriage longitudinally of the pit. The pair of wheels at one end of the truck are secured to an axle $c^4$ which is journalled in bearings $c^3$ which are mounted on the frame $c$. The pair of wheels $c'$ at the other end of the truck are fixed to an axle $c^4$ which is adapted to be driven to propel the truck. The mechanism for driving axle $c^4$ to propel the truck comprises an electric motor $c^5$ mounted on the cross-member $c^6$ of the frame $c$, a pinion $c^7$ on the shaft of the motor, a gear $c^8$ meshing with pinion $c^7$ and fixed to a shaft $c^9$, a pinion $c^{10}$ fixed to shaft $c^9$, and a gear $c^{11}$ fixed to axle $c^4$ and meshing with pinion $c^{10}$. Shaft $c^9$ is journalled in bearings $c^{12}$ which are fixed to the frame $c$. This exemplifies means for propelling the truck in the pit which extends longitudinally of the track A.

The drop table or carriage D, for supporting the transformer and raising and lowering it, comprises a frame composed of beams $d$ which are rigidly secured together by a pair of central cross members $d^2$ and a pair of gearhousings $d^3$. Four posts $d^4$, one pair adjacent each end of the carriage D, have their lower ends anchored in cross-members of the truckframe $c$, and their upper ends extended to pass through guide sockets $d^5$ which are fixed to the beams $d$ of the carriage frame, to vertically guide the carriage. Rollers $d^6$ in the upper and outer corners and rollers $d^7$ in the lower inner corners of sockets $d^5$ are provided to prevent binding between the posts $d^4$ and the carriage. This exemplifies means for vertically guiding the carriage on, and relatively to, the truck C.

Power-operated mechanism for raising and lowering the carriage with its load is provided, and comprises an electric motor $e$ which is mounted on a bed plate $e'$ fixed to one end of the carriage frame $d$, a sprocket $e^2$ fixed to the shaft of the motor, a silent chain $e^3$ driven by said sprocket, a sprocket $e^4$ fixed to a longitudinal shaft $e^5$, a pair of worms $e^6$ fixed to shaft $e^5$ and confined in housings $d^3$ respectively, worm gears $e^7$ meshing with said worms respectively, and screw-rods $d^8$ which are threaded to the hubs of gears $e^7$ respectively, and have their lower ends fixed in the cross members of the truck C. Housings $d^3$ are each provided with a removable top section $e^9$ to provide access to the gears $e^7$ and worms $e^6$. Gears $e^7$ are confined against vertical movement in the housings, so that rotation of the gears $e^7$ in one direction will cause the carriage D to be raised, and rotation in the opposite direction will cause the carriage to be lowered. Screw-rods $d^8$ and coacting gear sets $e^6$ and $e^7$ are centrally disposed adjacent the ends of the carriage D respectively. By employing the four guide posts $d^4$ and sockets $d^5$ adjacent the corners of the carriage, two screw-rods will be sufficient to operate and support the carriage vertically.

In practice it is desirable to have pits B between a number of the tracks in a shop for access to vehicles from underneath. In some instances it is, however, not necessary to use a drop-table structure, and in order to perform all of the work with one or the minimum number of drop-table structures, said structure is constructed so it can be removed as a unit from one pit to another. This makes it possible to place the drop table structure in any pit where a unit, such as a transformer, is to be removed.

For this purpose the truck C has fixed to its beams $c$ at either side and adjacent the ends of the truck, lugs or plates G which are provided with holes $g$ to receive hooks $g'$. Said hooks are suspended from a lifting beam $g^2$ which is adapted to be engaged by a hook $g^3$ suspended from a suitable overhead crane by which the truck structure can be lifted out of one pit and transported to and lowered into any of the associated pits. When this is done, the crane is brought into position above the pit containing the table structure. and hooks $g'$ are attached to the lugs $g$. The crane is then operated to lift the truck and the carriage thereon out of that pit and to transport and lower it into the desired pit. When the hooks $g'$ are disconnected from the lugs, the truck and its carriage will be usable in the pit to which they have been transferred.

To receive and support the transformer, the carriage D is provided with a pair of blocks $h$, $h'$. In practice it is necessary to bring the bolt holes on the transformer into registry with the holes in the brackets to which it is secured on the car. In placing the transformer on the blocks $h$, $h'$, it is usually necessary to shift the transformer laterally of the pit, either transversely or angularly, to correctly position it for attachment, and to permit this to be done, each of the blocks $h$, $h'$ is threaded to a screw-shaft $h^2$ which extends transversely through, and is held against, axial movement in the carriage frame. A crank or arm $h^3$ is secured to one end of either of the screw-shafts $h^2$. By turning both shafts, the transformer may be moved laterally and bodily toward one side or the other, and by independent turning of said shafts the transformer may be angularly shifted to bring the bolt holes therein into exact registry with those on the car. Each of the blocks $h$ is slidable on one of the cross-members $d^2$ of the carriage frame.

The operation will be as follows: When the transformer is to be removed, the railway car will be run into position over the pit to bring the transformer over the drop table structure. If necessary the truck C may be operated to bring the blocks $h$, $h'$ into position beneath the transformer. Next, the motor $e$ will be operated to lift the carriage D so that said blocks will engage the transformer and until the strain is taken off the connecting bolts between the transformer and the car. The bolts are then removed and the carriage D is lowered into the pit, so that the transformer will clear the trucks of the car. The truck C will then be propelled to move it longitudinally of the pit to a point away from the car. The carriage D will then be raised to lift the transformer out of the pit. The transformer is then removed from the carriage D by an overhead crane, and a transformer for replacement is placed on the carriage and the operation is reversed to bring the new transformer into position beneath the car. When the transformer is approximately in position, it may be shifted laterally into accurate vertical registry so the bolt holes of the connectible parts will be in accurate vertical registry, whereupon the bolts will be secured to attach the transformer.

The invention exemplifies a drop table structure which is adapted to greatly facilitate the labor in removing and replacing transformers from railway cars. It also exemplifies a vertically movable carriage which is narrower than the track and adapted to be raised between the rails into position to engage a unit attached to the body of a car, while the car remains on its trucks. It also exemplifies such a structure which is transferable from one pit to another to minimize the number of structures required in a railway shop.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an equipment of the character described, the combination with a track consisting of a pair of laterally spaced rails, and an elongated pit extending lengthwise of and between the rails, of a truck in the pit, a vertically movable carriage carried by the truck, and mechanism on the truck for raising and lowering the carriage into position to engage and support a unit attached to the bottom of a car on the track and over the pit, said truck being movable longitudinally of the pit and adapted to shift said unit, after it has been disconnected from the car, beyond one end of said car.

2. In an equipment of the character described, the combination with a track consisting of a pair of laterally spaced rails, and an elongated pit extending lengthwise of and between the rails, of a truck in the pit and movable longitudinally thereof, a vertically movable carriage carried by the truck and movable upwardly between the rails to engage and support a unit attached to the body of a car on the track and over the pit, and mechanism on the truck for raising and lowering the carriage.

3. In an equipment of the character described, the combination with a track consisting of a pair of laterally spaced rails, and an elongated pit extending lengthwise of and between the rails, of a truck in the pit and movable longitudinally thereof, mechanism for propelling the truck, a vertically movable carriage carried by the truck and movable upwardly between the rails to engage and support a unit attached to the body of a car on the track and over the pit, and mechanism on the truck for raising and lowering the carriage.

4. In an equipment of the character described, the combination with a track and a pit below the level of the track, of a carriage movable vertically in the pit and provided with means to engage and support a unit on a car on the track and over the pit, mechanism for raising and lowering the carriage, and means for laterally adjusting the engaging means so that the unit, after disconnection from the car, may be correctly positioned for re-attachment to said car.

5. In an equipment of the character described, the combination with a track and a pit below the level of the track, of a truck in the pit and movable longitudinally thereof, a vertically movable carriage carried by the truck, mechanism on the truck for raising and lowering the carriage, means on the carriage to engage and support a unit on a car on the track and over the pit, and means for adjusting the engaging means laterally so that the unit, after disconnection from the car, may be correctly positioned for re-attachment to said car.

6. In an equipment of the character described, the combination with a track consisting of a pair of laterally spaced rails and a pit extending lengthwise of and between the rails, of a truck in the pit and movable longitudinally thereof, a vertically movable carriage carried by the truck, mechanism on the truck for raising and lowering the carriage, blocks on the carriage to engage and support a unit on a car on the tracks and over the pit, and means for adjusting the blocks laterally so that the unit, after disconnection from the car, may be correctly positioned for re-attachment to said car.

7. In an equipment of the character described, the combination with a track consisting of a pair of laterally spaced rails and a pit extending lengthwise of and between the rails, of a truck in the pit and movable longitudinally thereof, a vertically movable carriage carried by the truck, mechanism on the truck for raising and lowering the carriage, blocks on the carriage to engage and support a unit on a car on the track and over the pit, and screws for adjusting the blocks laterally so that the unit, after disconnection from the car, may be correctly positioned for re-attachment to said car.

8. In an equipment of the character described, the combination with a track and a pit below the level of the track, of a truck in the pit and movable longitudinally thereof, a vertically movable carriage carried by the truck, guide posts on the truck, sockets on the carriage provided with rollers between which the posts are vertically slidable, and mechanism for raising and lowering the carriage.

9. In an equipment of the character described, the combination with a track and a pit below the level of the track, of a truck in the pit and movable longitudinally thereof, a vertically movable carriage carried by the truck, guide posts on the truck, sockets on the carriage provided with rollers between which the posts are vertically slidable, and mechanism for raising and lowering the carriage comprising a pair of screw-shafts centrally disposed at the ends of the carriage respectively.

10. In an equipment of the character described, the combination with a track consisting of a pair of laterally spaced rails, and a pit extending lengthwise of and between the rails, of a truck in the pit and movable longitudinally thereof, a vertically movable carriage carried by the truck, mechanism for raising and lowering the carriage, and means whereby the truck and carriage may be lifted bodily out of the pit and transferred to a second pit.

11. In an equipment of the character described, the combination with a track consisting of a pair of laterally spaced rails, and a pit extending lengthwise of and between the rails, of a truck in the pit and movable longitudinally thereof, a vertically movable carriage carried by the truck, mechanism for raising and lowering the carriage, and means on the truck for connection to a hoist, whereby the truck and carriage may be lifted bodily out of the pit and transferred to a second pit.

12. In an equipment of the character described, the combination with a track and a pit below the level of the track, of a truck in the pit and movable longitudinally thereof, a vertically movable carriage carried by the truck, mechanism for raising and lowering the carriage, and perforated plates attached to the truck adjacent to the corners thereof for connection to a hoist whereby the truck and carriage may be lifted bodily out of the pit and transferred to a second pit.

Signed at Harvey, Illinois, this 23d day of February, 1928.

FRANK P. WALSH.